United States Patent [19]
Chou

[11] Patent Number: 5,920,963
[45] Date of Patent: Jul. 13, 1999

[54] ROPE FASTENER

[76] Inventor: An-Chuan Chou, No. 212, Yung An St., Tainan, Taiwan

[21] Appl. No.: 09/098,334

[22] Filed: Jun. 17, 1998

[51] Int. Cl.⁶ .................................................. A44B 11/00
[52] U.S. Cl. ............................... 24/170; 24/191; 24/196
[58] Field of Search .................. 24/170, 191, 196, 24/171, 130, 115 M, 134 P, 68 CD, 69 CT

[56] References Cited

U.S. PATENT DOCUMENTS

| | | | |
|---|---|---|---|
| 2,143,126 | 1/1939 | Honegger | 24/196 |
| 2,919,481 | 1/1960 | Finken et al. | 24/196 |
| 3,084,411 | 4/1963 | Lindblad | 24/196 |
| 3,678,542 | 7/1972 | Prete, Jr. | 24/170 |
| 5,291,638 | 3/1994 | Huang | 24/170 |
| 5,423,644 | 6/1995 | First, Sr. | 24/68 CD |

FOREIGN PATENT DOCUMENTS

| | | | |
|---|---|---|---|
| 0933270 | 8/1963 | United Kingdom | 24/191 |
| 0939112 | 10/1963 | United Kingdom | 24/191 |

*Primary Examiner*—Victor N. Sakran
*Attorney, Agent, or Firm*—Rosenberg, Klein & Bilker

[57] ABSTRACT

A ropefastener includes a U-shaped base and a press member. The base has a front bottom and a rear bottom separated by a large opening. An inner lateral side of the front and the rear bottom are formed with a swelled up or down smooth edge so as to give no cutting or hurting function to a rope extending on them, prolonging the service life of the rope and obtaining the real safety of the rope fastener.

1 Claim, 5 Drawing Sheets

ROPE FASTENER

BACKGROUND OF THE INVENTION

This invention relates to a rope fastener, partilarly to one improved in its structure for fastening a binding rope for a long time without hurting the rope to prolong the service life of the rope and to obtain safety of the fastener.

A conventional rope fastener shown in FIG. 4 and 5, includes a U-shaped base 10 and a press member 20 combined together. The base 10 is U-shaped, having an opening 101 in a flat bottom which is divided with the opening into a front bottom 11 and a rear bottom 12, and a position hole 14 respectively in two vertical side wall extending up from the rear bottom 12 for a shaft 15 to fit therein, and a spring 16 is fitted around the shaft 15 for urging a flat portion of the press member 20.

The press member 20 is shaped as preset, having a flat press portion 21 formed in a left side, a lateral through hole 22 formed in a right side, and a toothed edge 23 formed in a lower side of the right side.

In assembling, firstly, the press member 20 is placed on the base 10, with the position through hole 22 aligned to the position holes 14 of the base 10. Then the shaft 15 with the spring 16 fitted around it is inserted in the position through hole 22 and the position holes 14.

In using, a rope 90 is made to extend between the base 10 and the press member 20, and a portion of the rope 90 is placed on the front bottom 11, and the press portion 21 of the press member 20 is compressed with a certain force, permitting press member 20 rotate a certain angle with the shaft 16 as a pivot to let the rope 90 between the toothed edge 23 and the upper surface of the front bottom extend therethrough. Then the press portion 21 the press portion 21 is released to let the spring 16 recover its resilience and permit the press member 20 rotate and return to its original position so that the toothed edge 23 may press down the rope 90 tightly in its position and unable to move.

However, when the rope 90 has to be stabilized on the base 10, an end portion of the rope 90 has to extend over the shaft 13, along the upper surface of the rear bottom 12, and through the opening 101 out. Or the end portion of the rope 90 has to extend through the opening 101 and a side of the front bottom 11. But the sides of the front bottom 11 and the rear bottom 12 are right-angled to form a cutting edge against the rope 90 when tightened. So after a long time of use of the rope 90 with the conventional rope fastener, the rope 90 may be gradually cut to completely break off, greatly reducing safety of the rope fastener.

SUMMARY OF THE INVENTION

The main purpose of the invention is to offer a rope fastener provided with a swelled up or down edge formed on the inner lateral sides of a front bottom and a rear bottom of a base defining an opening between the front and the rear bottom so that the rope may not be cut as by the sharp edges of the inner lateral sides of the front and the rear bottom of the conventional rope fastener.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
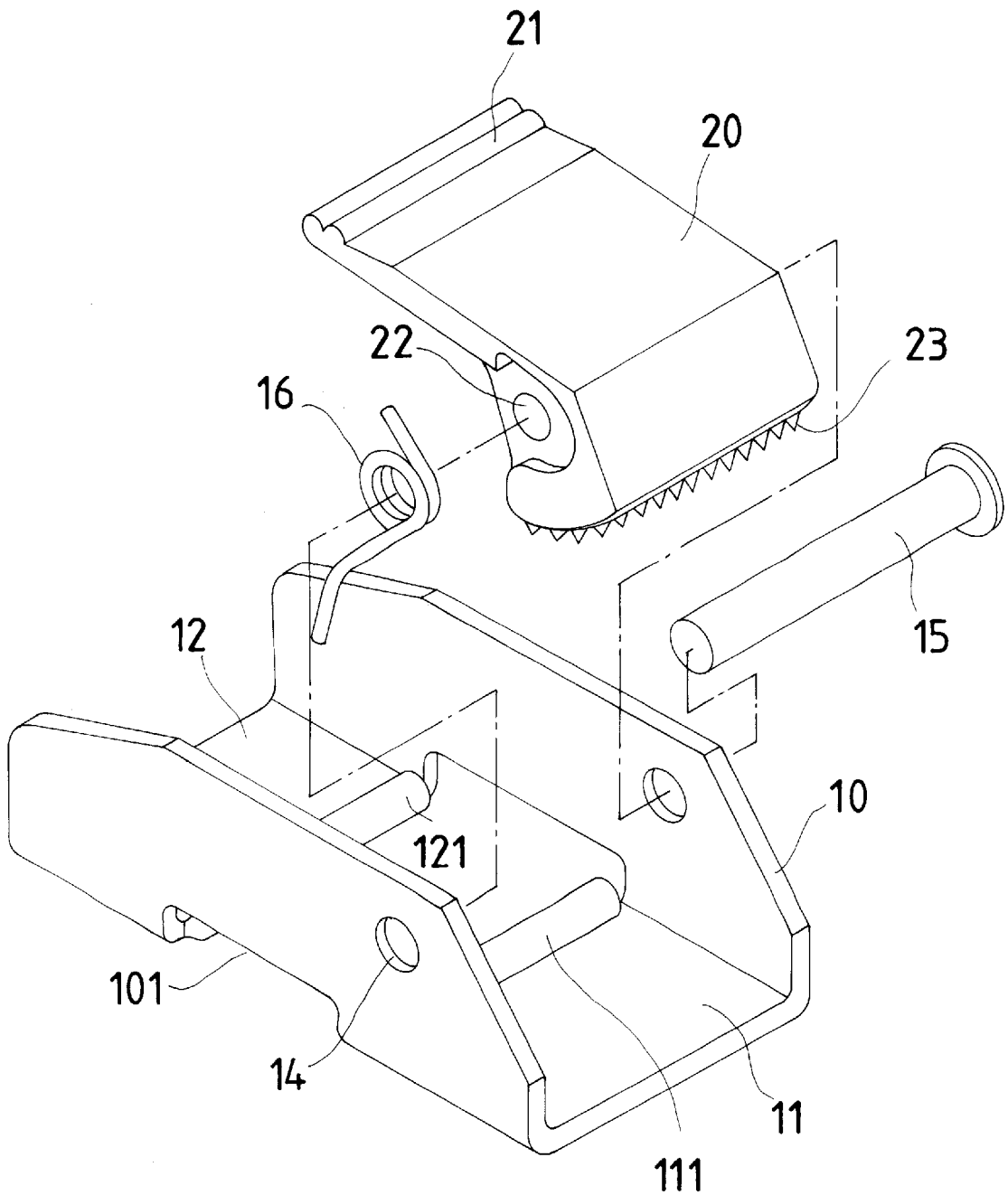
FIG. 1 is an exploded perspective view of a rope fastener of the present invention.
Figure 2:
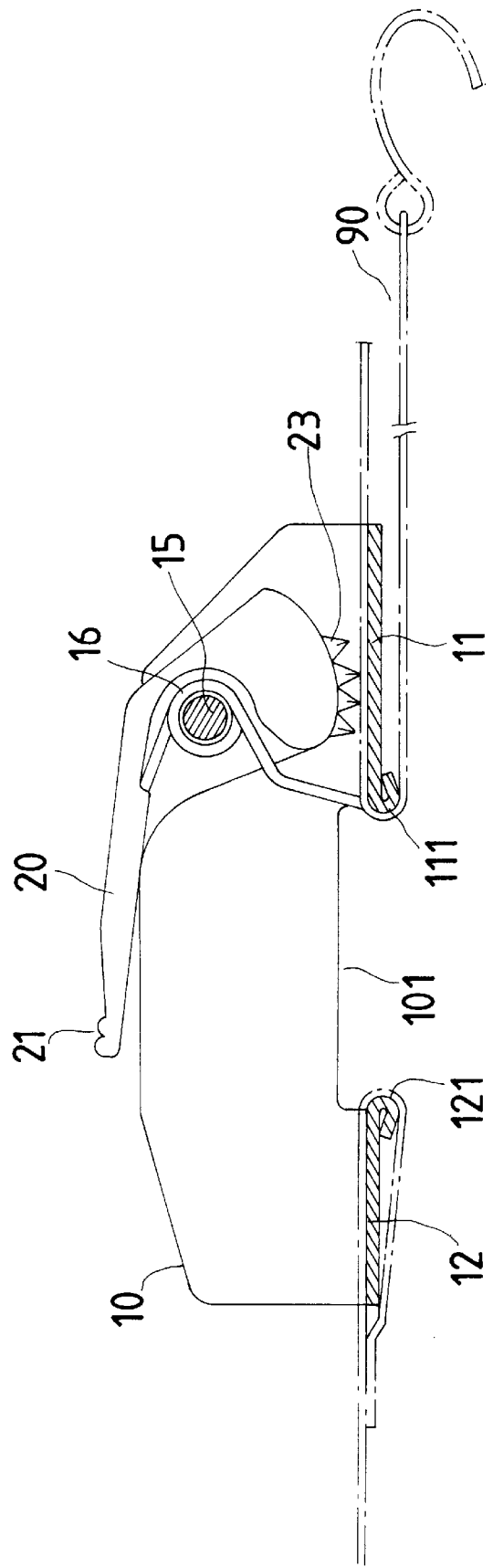
FIG. 2 is a side view of an embodiment of the rope fastener used with a binding rope of the present invention.

A preferred embodiment of a rope fastener, as shown in FIG. 1, includes a base 10 and a press member 20 as components combined together.

The base 10 has almost the same structure as that in the conventional rope fastener described above, with an improved feature that the front bottom 11 and the rear bottom 12 separated by the opening 101 have respectively an inner lateral side formed with a swelled up or down smooth edge 111, 121 for a binding rope 90 to lie on and slide without giving being cut or hurt so that the binding rope 90 may always have a certain strength and consequently a long service life. Then the rope fastener can obtain safety in practical use, with the rope never breaking off.

The press member 20 has the same structure as that of the conventional rope fastener, not described here.

Figure 3:
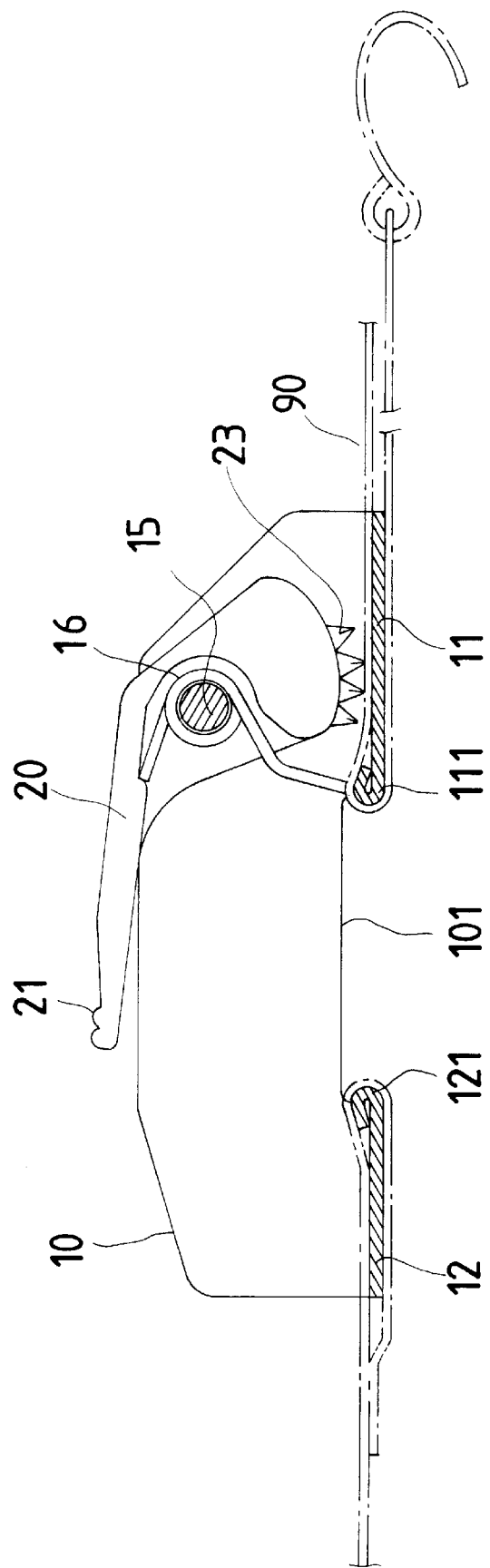
FIG. 3 is a side view of another embodiment of the rope fastener used with a binding rope of the present invention.
Figure 4:
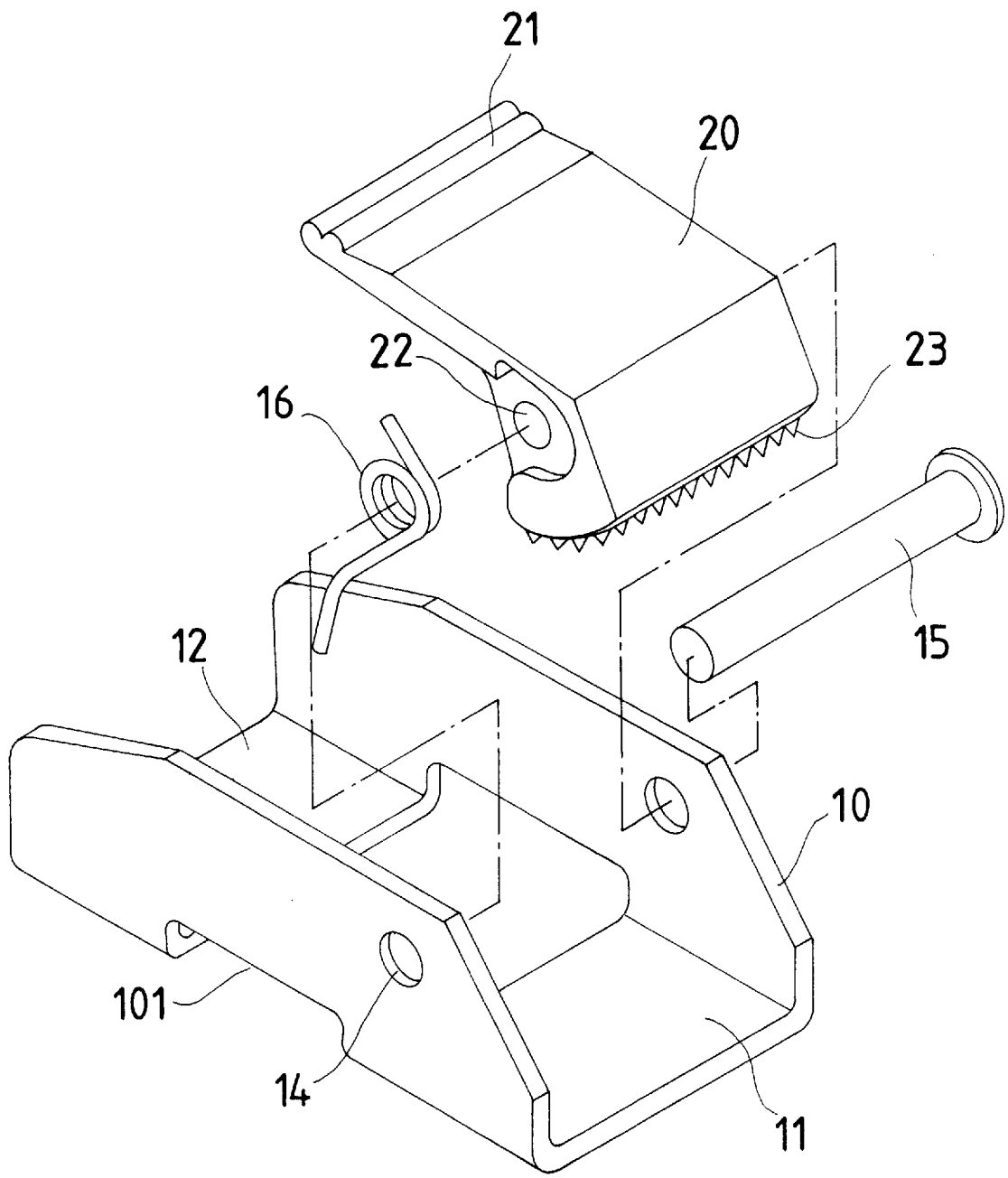
FIG. 4 is an exploded perspective view of a conventional rope fastener.
Figure 5:
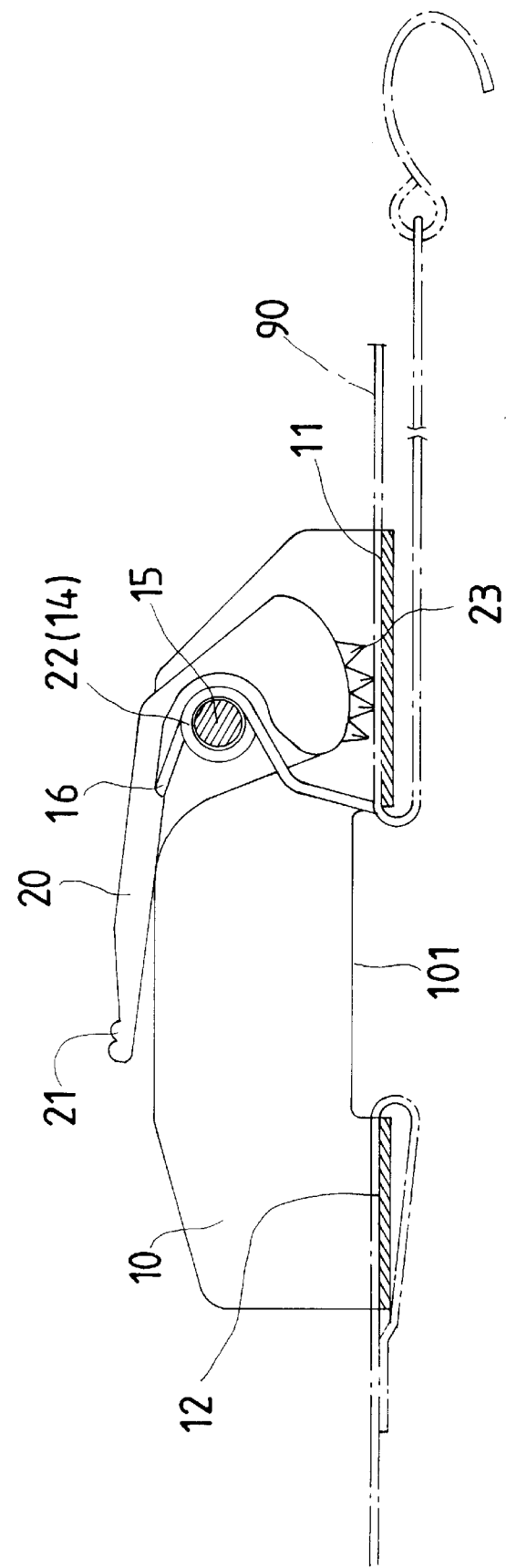
FIG. 5 is a side view of the conventional rope fastener used with a binding rope.

In using this rope fastener, referring to FIGS. 1 and 3, the swelled up or down edges of the front bottom and the rear bottom of the base largely improve the defect of those of the right angle in the conventional rope fastener that the rope may be gradually cut to break after a long time of use. The curvature of the swelled up or down smooth edges may disperse the pulling force the binding rope receives so as not to be cut or hurt, resulting in a long service life of the rope and the real safety of the rope fastener.

While the preferred embodiment of the invention has been described above, it will be recognized and understood that various modifications may be made therein and the appended claims are intended to cover all such modifications which may fall within the spirit and scope of the invention.

What is claimed is:

1. A rope fastener comprising a substantially U-shaped base and a press member pivotally coupled to said base, said base having an opening formed through a bottom wall thereof intermediate a rear bottom portion and a front bottom portion of said base, a bottom wall portion of said rear bottom portion of said base adjacent said opening being folded over to define a first smooth rounded edge on one side of said opening over which a first rope portion passes, a bottom wall portion of said front bottom portion of said base adjacent said opening being folded over to define a second smooth rounded edge on another side of said opening over which a second rope portion passes, said first and second smooth rounded edges respectively substantially preventing said first and second rope portions from being damaged thereby.

* * * * *